(12) United States Patent
Lin et al.

(10) Patent No.: US 6,856,885 B2
(45) Date of Patent: Feb. 15, 2005

(54) VEHICLE STABILITY ENHANCEMENT CONTROL

(75) Inventors: William C. Lin, Troy, MI (US); Shih-Ken Chen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/404,371

(22) Filed: Apr. 1, 2003

(65) Prior Publication Data

US 2004/0199321 A1 Oct. 7, 2004

(51) Int. Cl.$^7$ ................................. G06F 19/00
(52) U.S. Cl. ................ 701/70; 701/36; 303/146; 477/34; 477/107; 340/438
(58) Field of Search ................ 701/70, 84, 301, 701/36, 82, 74, 41; 340/903, 436, 438; 303/140, 141, 166, 167, 146; 280/5.51; 180/197, 204, 446, 443; 477/34, 115, 107

(56) References Cited

U.S. PATENT DOCUMENTS

| | | | | |
|---|---|---|---|---|
| 5,676,433 A | * | 10/1997 | Inagaki et al. | 303/146 |
| 5,720,533 A | | 2/1998 | Pastor et al. | 303/147 |
| 5,797,663 A | | 8/1998 | Kawaguchi et al. | 303/146 |
| 5,862,503 A | | 1/1999 | Eckert et al. | 701/78 |
| 5,931,887 A | | 8/1999 | Hac | 701/71 |
| 6,035,251 A | | 3/2000 | Hac et al. | 701/70 |
| 6,219,610 B1 | | 4/2001 | Araki | 701/72 |
| 6,374,172 B1 | * | 4/2002 | Yamaguchi et al. | 701/90 |
| 6,658,342 B1 | * | 12/2003 | Hac | 701/70 |
| 6,662,898 B1 | * | 12/2003 | Mattson et al. | 180/446 |
| 6,691,017 B2 | * | 2/2004 | Banno et al. | 701/84 |
| 2002/0143451 A1 | | 10/2002 | Hac et al. | 701/42 |
| 2003/0089542 A1 | * | 5/2003 | Mori | 180/197 |
| 2003/0125864 A1 | * | 7/2003 | Banno et al. | 701/84 |

FOREIGN PATENT DOCUMENTS

| | | | | |
|---|---|---|---|---|
| JP | 10181552 A | * | 7/1998 | B60T/8/24 |
| JP | 2001004650 A | * | 1/2001 | G01P/15/00 |

OTHER PUBLICATIONS

Dorgham, "International Journal o Vehicle Design", vol. 23, Nos. 1/2, 2000, pp. 136–149.

* cited by examiner

Primary Examiner—Thomas G. Black
Assistant Examiner—Tuan C To
(74) Attorney, Agent, or Firm—Kathryn A. Marra

(57) ABSTRACT

A side-slip velocity estimation module for a vehicle stability enhancement control system includes a side-slip acceleration estimation module that determines an estimated side-slip acceleration of a vehicle. A limited-frequency integrator integrates the estimated side-slip acceleration to determine an estimated side-slip velocity of the vehicle. A reset logic module clears an output of the limited-frequency integrator when a first condition occurs. The first condition is one of a straight-driving condition, a speed condition, and a sensor bias condition. The estimated side-slip velocity is compared to a desired side-slip velocity to produce a side-slip control signal. The side-slip control signal is combined with a yaw rate control signal to produce an actuator control signal. The actuator control signal is received by one of at least one brake actuator and a rear-wheel steering actuator to create a yaw moment to correct a dynamic behavior of the vehicle.

23 Claims, 9 Drawing Sheets

VEHICLE STABILITY ENHANCEMENT CONTROL

FIELD OF THE INVENTION

The present invention relates to vehicles, and more particularly to vehicle stability control systems.

BACKGROUND OF THE INVENTION

There are two motions that take place when a vehicle turns. The first motion is a turning motion called yaw motion. Yaw motion takes place as the vehicle body spins around an imaginary axis that is vertical to the ground. The second motion is a lateral sliding motion called side-slip motion. Side-slip motion occurs in the same direction as the turn or in the opposite direction depending on the speed of the vehicle.

A desired yaw rate and side-slip velocity are determined based on the speed of a vehicle and the position of the steering wheel. The desired values correspond to the expected yaw rate and side-slip velocity when a vehicle is traveling on a dry and clean surface. When the actual yaw rate and/or side-slip velocity significantly surpasses the desired values, the driver feels a loss of control of the vehicle.

The actual yaw rate and side-slip velocity of the vehicle are compared to the desired values. Corrective action is taken when the desired values are surpassed by a predetermined threshold. When a significant discrepancy exists between the desired yaw rate and the actual yaw rate and/or the desired side-slip velocity and the actual side-slip velocity of the vehicle, it is likely the road conditions necessitate vehicle stability enhancement.

Current methods of vehicle stability enhancement include using yaw rate feedback and side-slip acceleration feedback control signals. The yaw rate of a vehicle can be measured using a commercially available yaw rate sensor. The side-slip velocity of a vehicle can be measured using side-slip velocity sensors, which are very expensive. Instead of using a sensor, side-slip acceleration can be estimated based on the lateral acceleration, yaw rate, and speed of a vehicle. Ideally, the side-slip velocity of a vehicle can be obtained by integrating the side-slip acceleration. However, since sensor bias exists in yaw rate sensors and lateral accelerometers, the integration tends to drift due to the unwanted bias signal being integrated.

In one conventional approach, a vehicle stability enhancement system uses yaw rate feedback and side-slip angle feedback (which can be derived from side-slip velocity) to create a corrective yaw moment to correct a dynamic behavior of a vehicle. The estimation of side-slip velocity is implemented using a dynamic observer that captures the estimated state of dynamics of the vehicle. However, the estimation is based on a vehicle's cornering compliances, which are variable vehicle parameters. The cornering compliances vary over a wide range and depend on the type of surface that the vehicle is operating on. Therefore, the estimate is not as accurate as desired.

SUMMARY OF THE INVENTION

A vehicle stability enhancement control system according to the present invention includes a side-slip velocity estimation module. A side-slip acceleration estimation module determines an estimated side-slip acceleration of a vehicle. A limited-frequency integrator integrates the estimated side-slip acceleration to determine an estimated side-slip velocity of the vehicle.

In other features, the estimated side-slip acceleration is determined based on a yaw rate, a lateral acceleration, and a speed of the vehicle. A reset logic module clears an output of the limited-frequency integrator when a first condition occurs. The first condition is a straight-driving condition that is determined based on a yaw rate, a lateral acceleration, and an angle of a steering wheel of the vehicle. The first condition is a speed condition that is based on a speed of the vehicle. The first condition is a sensor bias condition that is based on the estimated side-slip acceleration.

In still other features of the invention, the limited-frequency integrator includes a high-pass filter. The limited-frequency integrator includes a feedback loop. The estimated side-slip velocity is compared to a desired side-slip velocity to produce a side-slip control signal. The side-slip control signal is combined with a yaw rate control signal to produce an actuator control signal. The actuator control signal is received by at least one brake actuator that applies a brake pressure difference across at least one axle of the vehicle to create a yaw moment to correct a dynamic behavior of the vehicle. The actuator control signal is received by a rear-wheel steering actuator that turns a set of rear wheels of the vehicle to create a yaw moment to correct a dynamic behavior of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
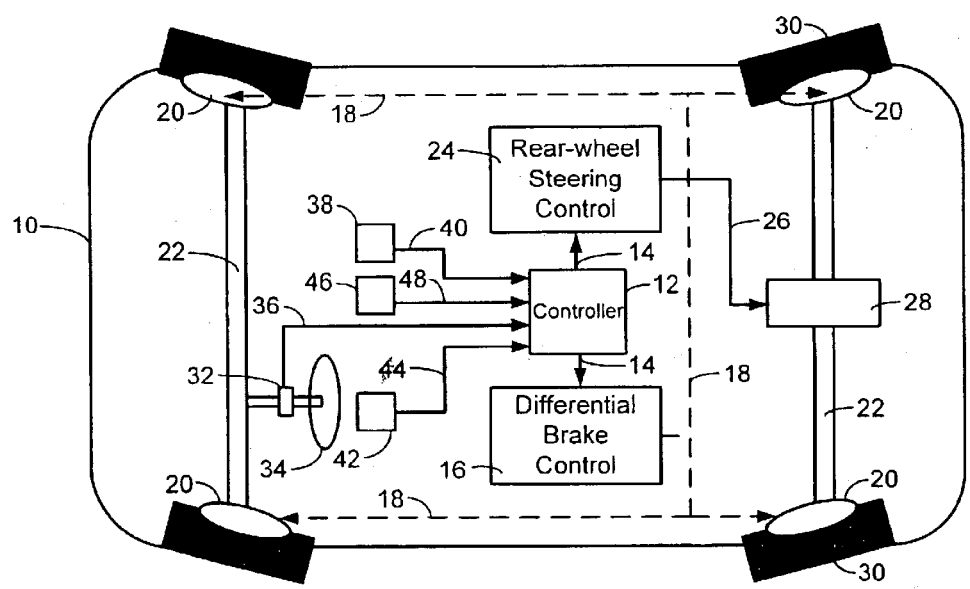
FIG. 1 illustrates a vehicle stability enhancement system with differential braking control and rear-wheel steering control.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, an exemplary vehicle stability enhancement system is illustrated for a vehicle 10 with rear-wheel steering and differential braking. To implement differential braking, a controller 12 sends an actuator control signal 14 to a differential brake control module 16. The differential brake control module 16 sends a brake control signal 18 to one or more brake actuators 20. The brake control signal 18 instructs the brake actuators 20 to create a brake pressure difference across at least one of the axles 22 of the vehicle 10. The brake pressure difference creates a yaw moment to correct a dynamic behavior of the vehicle 10 when there is a discrepancy between a desired yaw rate and actual yaw rate and/or a desired side-slip velocity and actual side-slip velocity of the vehicle 10.

To implement rear-wheel steering, the controller 12 sends the actuator control signal 14 to a rear-wheel steering control module 24. The rear-wheel steering control module 24 sends a steering control signal 26 to a rear-wheel steering actuator 28. The rear-wheel steering actuator 28 turns a set of rear wheels 30 of the vehicle 10 to create a yaw moment to correct the dynamic behavior of the vehicle 10. While the vehicle stability enhancement system of FIG. 1 implements both differential braking and rear-wheel steering, either system alone or other methods could be used for vehicle stability enhancement.

Whether differential braking, rear-wheel steering, or both are implemented, the controller 12 receives information about the operating conditions of the vehicle 10 from several sensors. A steering wheel angle sensor 32 detects the position of a steering wheel 34 of the vehicle 10 and sends a steering wheel angle signal 36 to the controller 12. A speed sensor 38 detects the speed of the vehicle 10 and sends a speed signal 40 to the controller 12. A lateral accelerometer 42 detects the lateral acceleration of the vehicle 10 and sends a lateral acceleration signal 44 to the controller 12. A yaw rate sensor 46 detects the yaw rate of the vehicle 10 and sends a yaw rate signal 48 to the controller 12. While the controller 12 is shown as an independent element of the vehicle 10, it may be implemented as part of a computer of the vehicle 10. Additionally, the rear-wheel steering control module 24 and the differential brake control module 16 may have independent controllers to process information collected from the sensors. The present invention may also be implemented as a feature that a driver could turn off. Typically, an expert driver can outperform a vehicle stability enhancement system.

Figure 2:
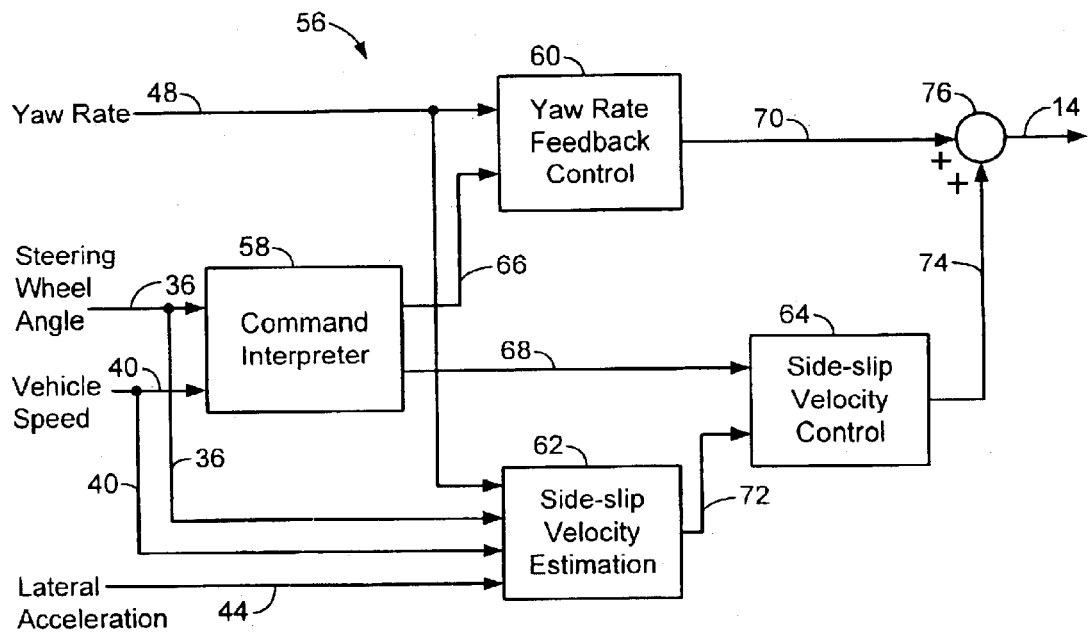
FIG. 2 is a functional block diagram of a vehicle stability enhancement control system.

Referring now to FIG. 2, the controller 12 implements a vehicle stability enhancement control system 56 that includes a command interpreter module 58, a yaw rate feedback module 60, a side-slip velocity estimation module 62, and a side-slip velocity feedback module 64. The command interpreter module 58 generates a desired yaw rate signal 66 and a desired side-slip velocity signal 68 based on the steering wheel angle signal 36 and the speed signal 40. If the values of the desired yaw rate signal 66 and/or the desired side-slip velocity signal 68 are surpassed by a predetermined threshold, it is likely the road conditions necessitate vehicle stability enhancement and a driver feels a loss of control of the vehicle 10. The predetermined threshold may be a function of the speed of the vehicle 10.

The yaw rate feedback module 60 generates a yaw rate control signal 70 by comparing the yaw rate signal 48 and the desired yaw rate signal 66. The side-slip velocity estimation module 62 generates an estimated side-slip velocity signal 72 based on the steering wheel angle signal 36, speed signal 40, and lateral acceleration signal 44. The side-slip velocity feedback module 64 generates a side-slip velocity control signal 74 by comparing the desired side-slip velocity signal 68 and the estimated side-slip velocity signal 72. A summing node 76 combines the yaw rate control signal 70 and the side-slip velocity control signal 74 to generate the actuator control signal 14. The actuator control signal 14 instructs the differential brake control module 16, the rear-wheel steering control module 24, or both to create a corrective yaw moment to correct the dynamic behavior of the vehicle 10.

Figure 3:
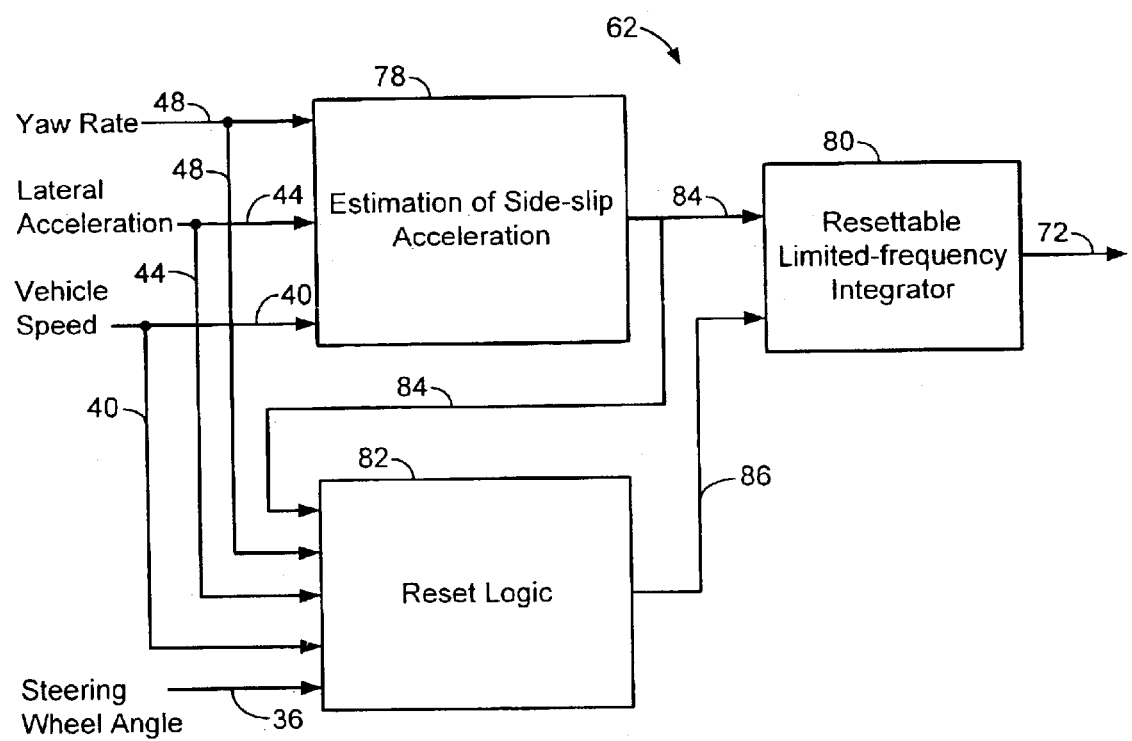
FIG. 3 is a functional block diagram of the side-slip velocity estimation module of FIG. 2.

Referring now to FIG. 3, the side-slip velocity estimation module 62 includes a side-slip acceleration estimation module 78, an integration module 80, and a reset logic module 82. The side-slip acceleration estimation module 78 generates an estimated side-slip acceleration signal 84 based on the yaw rate signal 48, lateral acceleration signal 44, and the speed signal 40. The estimated side-slip acceleration signal 84 is the integrand of the integration module 80. The integration module 80 integrates the estimated side-slip acceleration signal 84 to generate the estimated side-slip velocity signal 72. The reset logic module 82 generates a reset signal 86 based on the estimated side-slip acceleration signal 84, the lateral acceleration signal 44, the speed signal 40, and the steering wheel angle signal 36.

The integration module 80 preferably includes a resettable limited-frequency integrator. A resettable integrator works like a typical integrator to accumulate the values of the integrand when a reset command is inactive (FALSE). The resultant integral is cleared to zero when the reset command is active (TRUE). A limited-frequency integrator has a limitation on its input frequency range. If the sensors used to estimate side-slip acceleration were ideal, there would be no need to reset the integrator or limit its input frequency range. Side-slip velocity is mathematically the integration of side-slip acceleration. However, practically all sensors have bias and/or drift as understood by those skilled in the art of vehicle controls. Without resetting the integrator or limiting its input frequency, the integrator would continue to accumulate the bias and/or drift, which reduces the accuracy of the signal. Ideally, the bias and/or drift components could be estimated and removed before the integration process. However, a bias and/or drift removal process would be very difficult. Although the bias and/or drift are not removed or blocked off completely when the reset command is inactive, the accumulation during such a limited period of time is not significant enough to cause adverse effects in the control system. Limiting the input frequency range reduces the effect of steady-state or near-steady-state bias and/or drift.

The integration module 80 accepts the reset signal 86 and clears the estimated side-slip velocity signal 72 when the reset signal 86 is TRUE. The reset signal 86 is TRUE when the existing vehicle motion does not require vehicle stability enhancement. The estimated side-slip velocity signal 72 is the integral of the estimated side-slip acceleration signal 84 when the reset signal 86 is FALSE. The reset signal 86 is FALSE when the existing vehicle motion requires vehicle stability enhancement.

Figure 4:
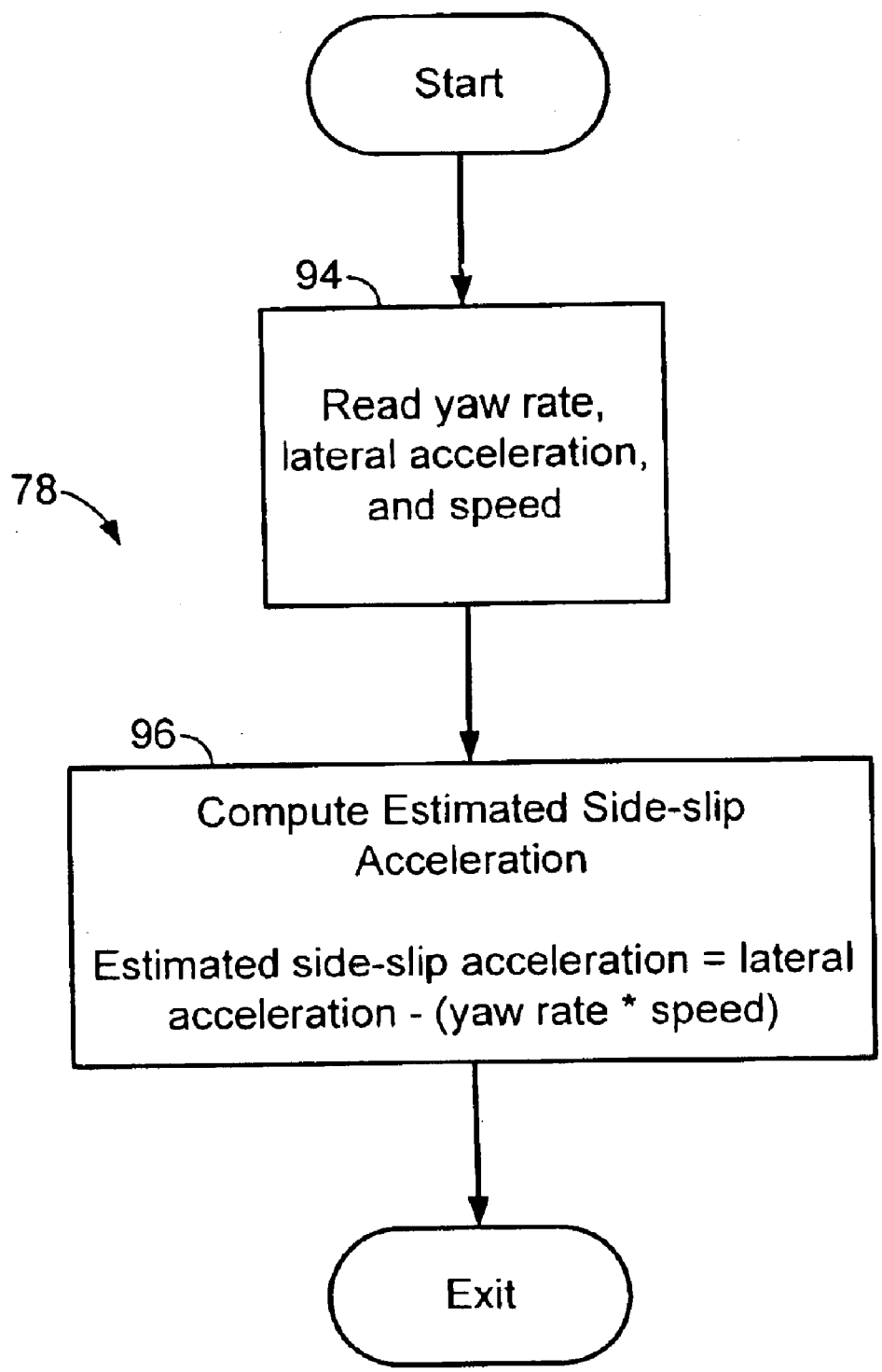
FIG. 4 is a functional block diagram of the side-slip acceleration estimation module of FIG. 3.

Referring now to FIG. 4, the side-slip acceleration estimation module 78 is further illustrated. Side-slip acceleration is estimated based on the values of the yaw rate signal 48, the lateral acceleration signal 44, and the speed signal 40. In step 94, the controller 12 reads the current value of the yaw rate signal 48, lateral acceleration signal 44, and speed signal 40. In step 96, the estimated side-slip acceleration is calculated. The product of the yaw rate and speed is subtracted from the lateral acceleration. The result is the value of the estimated side-slip acceleration signal 84.

Figure 5:
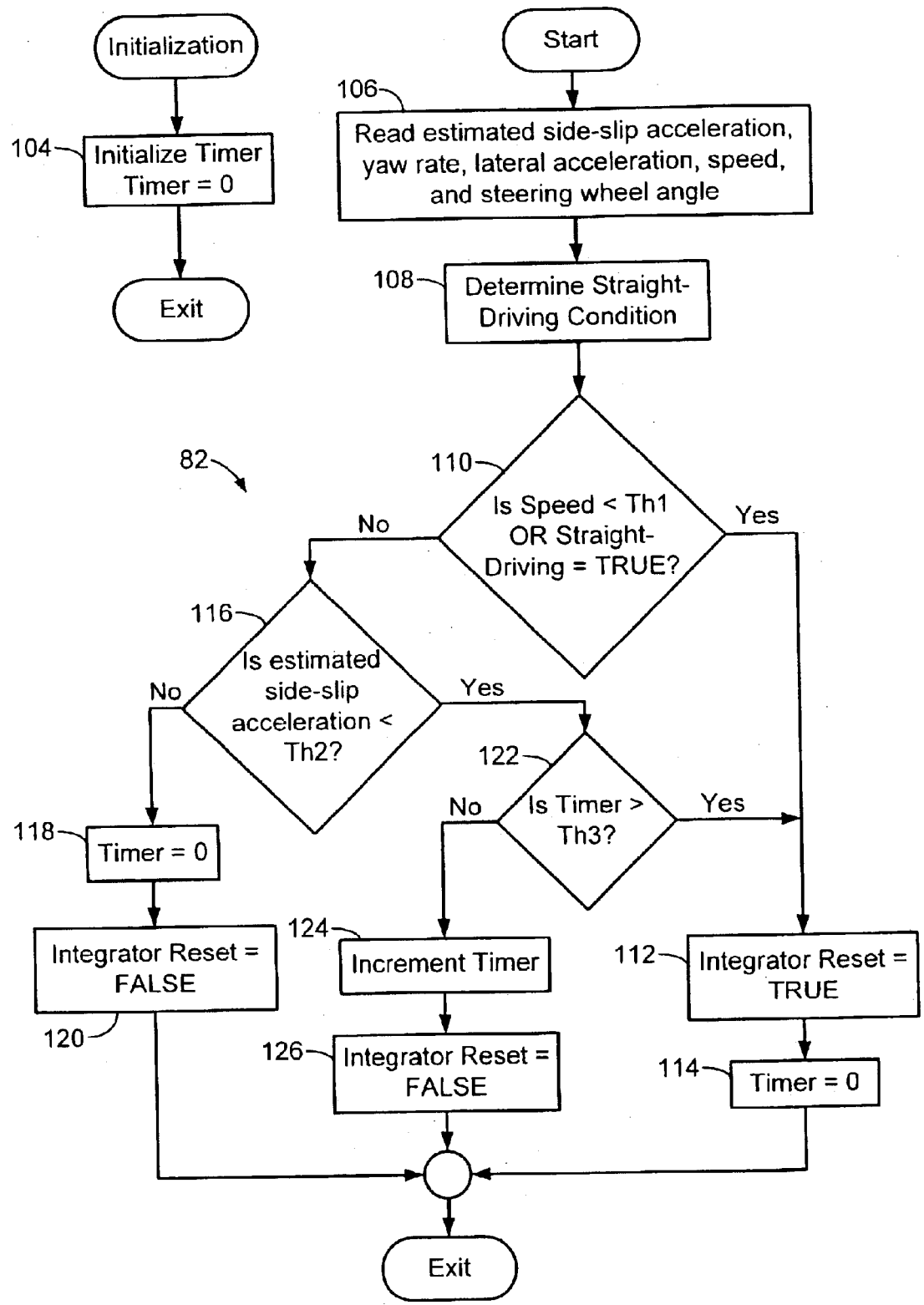
FIG. 5 is a functional block diagram of the reset logic module of FIG. 3.

Referring now to FIG. 5, the reset logic module 82 is further illustrated. In step 104, a timer is initialized and set to zero. Step 104 is preferably performed before the reset logic module 82 is executed for the first time after the vehicle 10 is turned on. In step 106, the controller 12 reads the current values of the estimated side-slip acceleration signal 84, the yaw rate signal 48, the speed signal 40, and the steering wheel angle signal 36. In step 108, the controller 12 determines a straight-driving condition that indicates whether the vehicle 10 is turning or not. In step 110, the controller 12 proceeds to step 112 if the speed of the vehicle 10 is below a first threshold value or the straight-driving condition is TRUE. In step 112, the reset signal 86 is set to TRUE and the output of the integration module 80 is cleared. Following step 112, the controller 12 resets the timer to zero in step 114. The fact that the vehicle 10 is not turning and/or is traveling below a threshold speed, 10 miles per hour for example, indicates that there is no potential need for vehicle stability enhancement.

If the speed of the vehicle 10 is above the first threshold and the straight-driving condition is FALSE, the controller 12 proceeds from step 110 to step 116. The fact that the vehicle 10 is turning and the speed is above a first threshold value indicates the potential need for vehicle stability enhancement. In step 116, the controller 12 proceeds to step 118 if the absolute value of the estimated side-slip acceleration is above a second threshold value. When the estimated side-slip acceleration is above the second threshold value, it is likely that the value of the estimated side-slip acceleration signal 84 is caused by genuine vehicle motion and not sensor bias or drift. In step 118, the timer is reset to zero and the controller 12 proceeds to step 120. The reset signal 86 is set to FALSE and the output of the integration module 80 is the estimated side-slip velocity.

If the absolute value of the estimated side-slip acceleration is below the second threshold, 0.02 g for example, the controller 12 proceeds to step 122. In step 122, the controller 12 proceeds to step 124 when the timer is below a third threshold value. Step 124 increments the timer and the controller 12 proceeds to step 126. The reset signal 86 is set to FALSE and the output of the integration module 80 is the estimated side-slip velocity. When the absolute value of the estimated side-slip acceleration is above the second threshold and the timer is above the third threshold, it is likely that the value of the estimated side-slip acceleration is actually caused by sensor bias and drift and not genuine vehicle motion. If the timer is above the third threshold, two seconds for example, the controller 12 proceeds to step 112.

Figure 6:
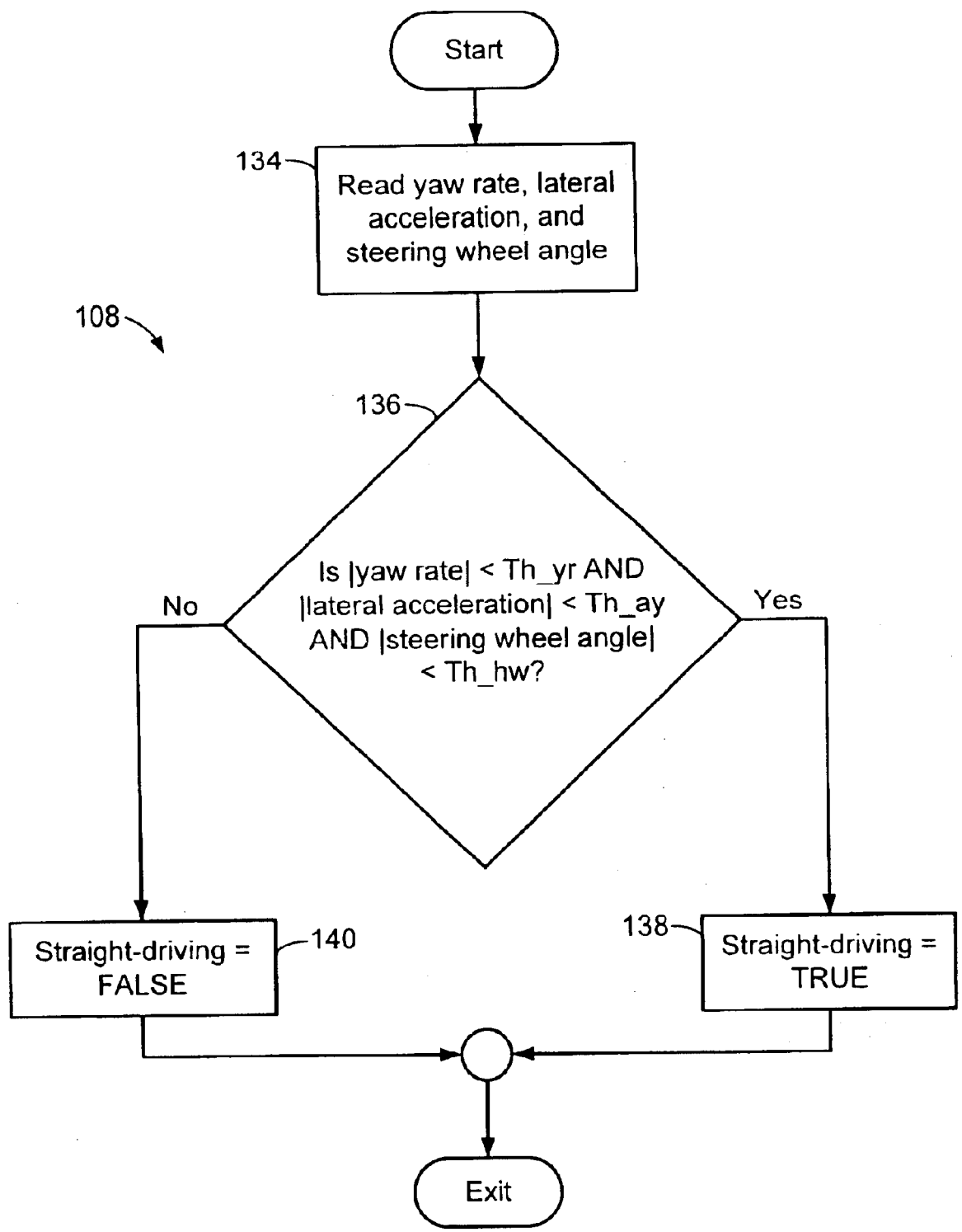
FIG. 6 is a functional block diagram of the straight-driving condition module of FIG. 5.

Referring now to FIG. 6, step 108 of FIG. 5 is further illustrated. In step 134, the controller 12 reads the current values from the yaw rate signal 48, the lateral acceleration signal 44, and the steering wheel angle signal 36. In step 136, the controller 12 proceeds to step 138 when the absolute value of the yaw rate is less than a first threshold, the absolute value of the lateral acceleration is below a second threshold, and the steering wheel angle is below a third threshold. Otherwise, the controller 12 proceeds to step 140. Step 138 sets the straight-driving condition to TRUE, and step 140 sets the straight-driving condition to FALSE.

Figure 7:
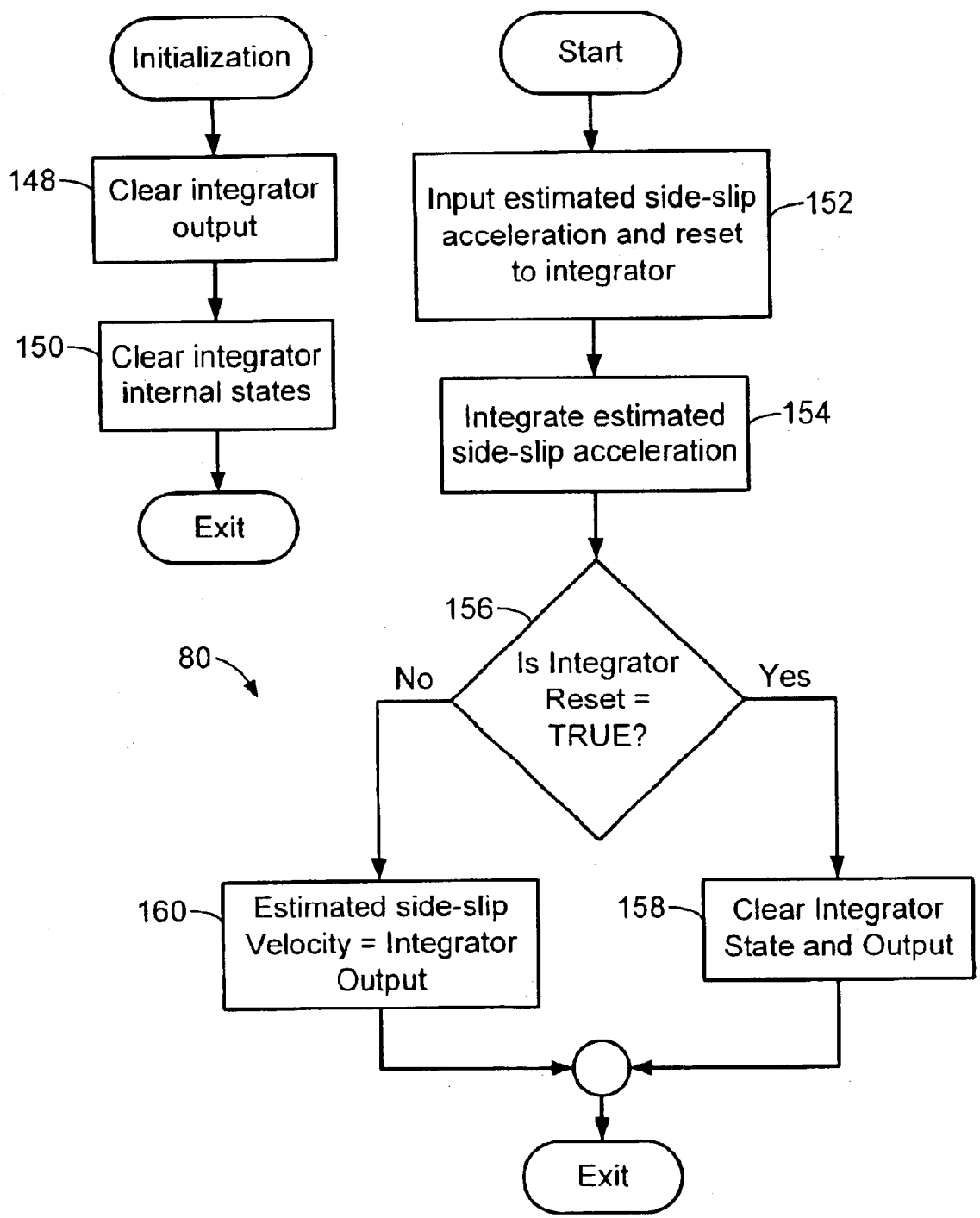
FIG. 7 is a functional block diagram of the integration module of FIG. 3.

Referring now to FIG. 7, the integration module 80 is further illustrated. In step 148, the output of the integration module 80 is cleared. In step 150, the internal states of the integration module 80 are cleared. Steps 148 and 150 are preferably performed before the integration module 80 is executed for the first time after the vehicle 10 is turned on. In step 152, the current values of the estimated side-slip acceleration signal 84 and the reset signal 86 are input to the integration module 80. In step 154, the integration module 80 integrates the estimated side-slip acceleration. In step 156, the controller 12 proceeds to step 158 when the reset signal 86 is set to TRUE. Step 158 clears the output and internal states of the integration module 80. Otherwise, the controller 12 proceeds from step 156 to step 160 when the reset signal 86 is FALSE. At step 160, the output of the integration module 80 is the value of the estimated side-slip velocity signal 72.

Figure 8:
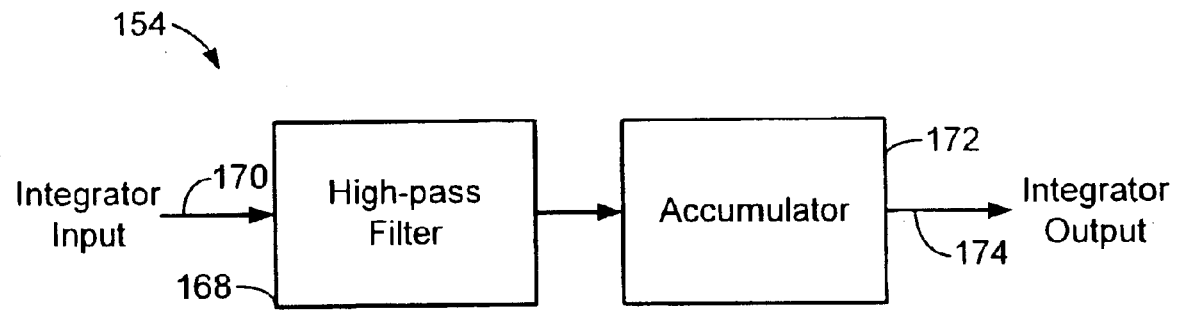
FIG. 8 is a functional block diagram of a limited-frequency integrator including a high-pass filter.
Figure 9:
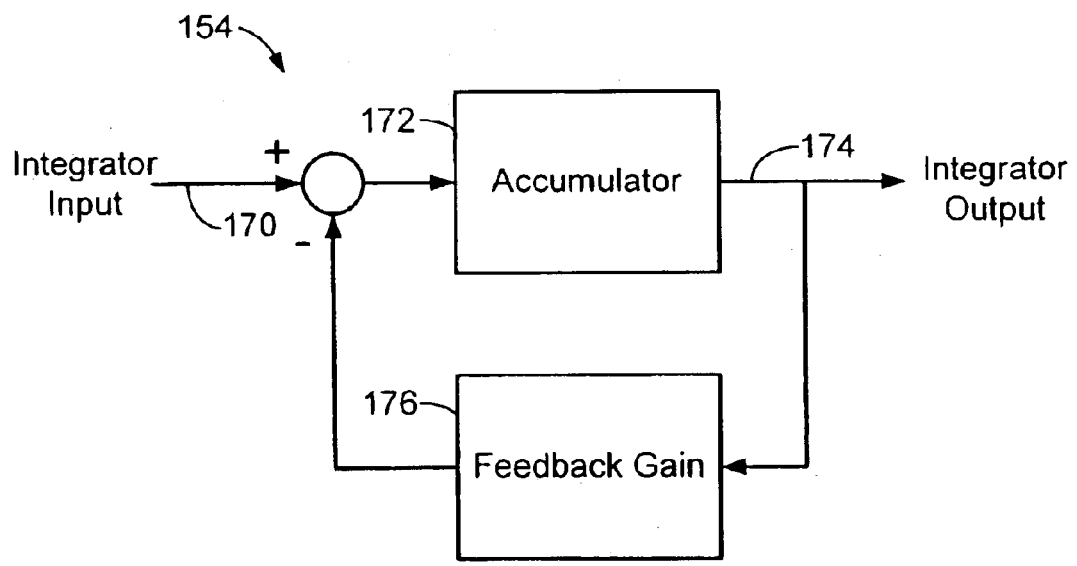
FIG. 9 is a functional block diagram of a limited-frequency integrator including a feedback loop.

Referring now to FIGS. 8 and 9, step 154 of FIG. 7 is further illustrated. The input to the integration module 80 has a limit on its frequency range. This is to ensure that sensor bias or drift does not have a significant effect on the estimation of vehicle side-slip velocity. The bias or drift is typically a steady-state or near-steady-state condition with a near-zero frequency.

FIG. 8 illustrates an exemplary method of frequency limitation. A high-pass filter 168 is applied to an input signal 170. The cutoff frequency is set to a low level, 0.05 Hz for example, to represent the frequency of sensor bias or drift signals. Following the high-pass filter 168, the signal proceeds to an accumulator 172 and an integrator output signal 174 represents the integral of the input signal 170.

FIG. 9 shows another exemplary method of frequency limitation including a feedback loop. A feedback gain 176 is multiplied by the integrator output signal 174 and offsets the input signal 170. The feedback gain 176 is chosen to be a frequency below which the integration of the input signal 170 is to be limited, as understood by those skilled in the art of system dynamics. When the frequency of the input signal 170 is significantly larger than the feedback gain 176, the limited-frequency integrator behaves like a standard integrator. When the frequency of the input signal 170 is below the feedback gain 176, the limited-frequency integrator behaves like a process with a constant gain that is determined by the feedback gain 176. Therefore, signals due to sensor bias will not be integrated and will be limited to a component that is the product of the magnitude of the bias and the feedback gain.

Figure 10A:
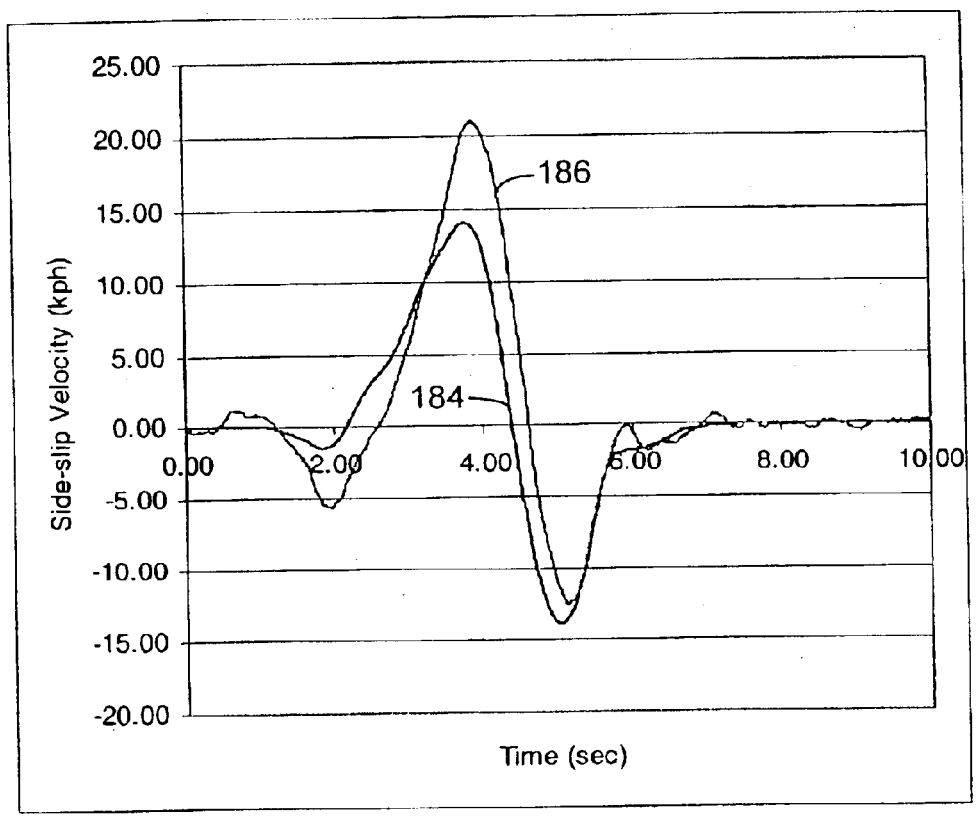
FIG. 10A is a plot of actual side-slip velocity and estimated side-slip velocity as a function of time without the presence of sensor bias.
Figure 10B:
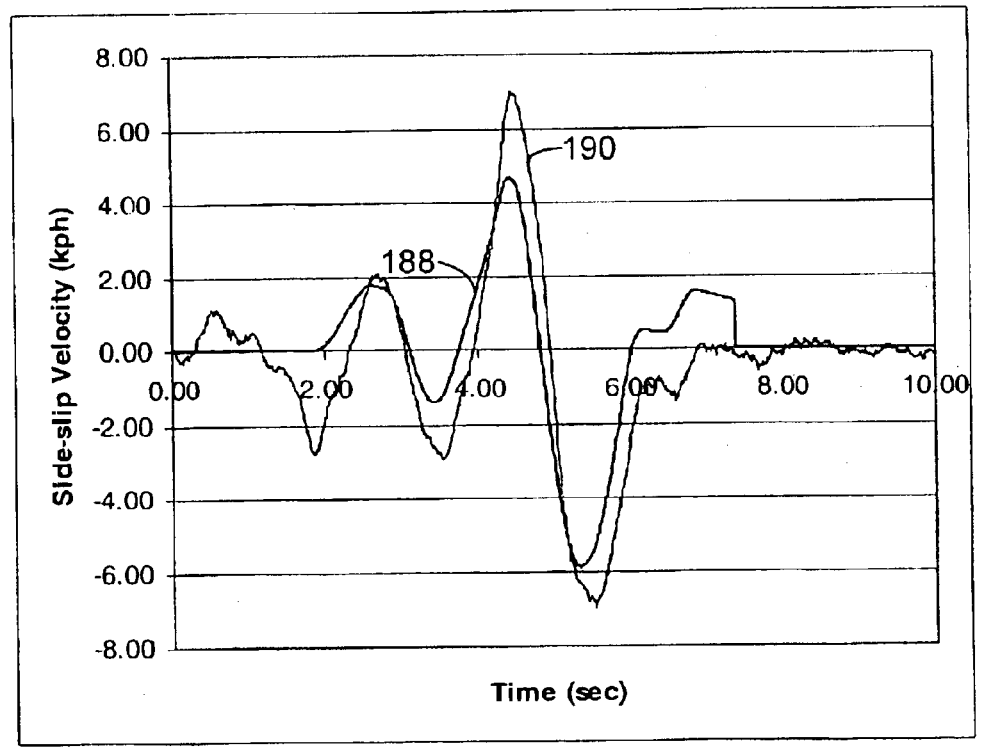
FIG. 10B is a plot of actual side-slip velocity and estimated side-slip velocity as a function of time with the presence of sensor bias.

Referring now to FIGS. 10A and 10B, the effect of side-slip velocity estimation is illustrated with and without the presence of sensor bias and drift. FIG. 10A shows an estimated side-slip velocity plot 184 and a measured side-slip velocity plot 186 without the presence of sensor bias. The estimated side-slip velocity plot 184 closely follows the measured side-slip velocity plot 186. FIG. 10B shows an estimated side-slip velocity plot 188 and a measured side-slip velocity plot 190 with the presence of sensor bias. The estimated side-slip velocity plot 188 departs from the path of the measured side-slip velocity plot 190 towards the end of the graph. At that point, the integrator is reset and the integration process is terminated to prevent the integrator from accumulating undesired signals due to sensor bias. This prevents the stability enhancement control system from making a false control action.

The present invention provides for improved vehicle stability enhancement including a more accurate estimation of vehicle side-slip velocity. This is achieved with little software overhead and without additional hardware costs over and above the existing state-of-the-art stability enhancement systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A side-slip velocity estimation module for a vehicle stability enhancement control system, comprising:
    a side-slip acceleration estimation module that determines an estimated side-slip acceleration of a vehicle;
    a limited-frequency integrator that integrates said estimated side-slip acceleration to determine an estimated side-slip velocity of said vehicle; and
    a reset logic module that clears an output of said limited-frequency integrator when a first condition occurs.

2. The side-slip velocity estimation module of claim 1 wherein said estimated side-slip acceleration is determined based on a yaw rate, a lateral acceleration, and a speed of said vehicle.

3. The side-slip velocity estimation module of claim 1 wherein said first condition is a straight-driving condition that is determined based on a yaw rate, a lateral acceleration, and an angle of a steering wheel of said vehicle.

4. The side-slip velocity estimation module of claim 1 wherein said first condition is a speed condition that is based on a speed of said vehicle.

5. The side-slip velocity estimation module of claim 1 wherein said first condition is a sensor bias condition that is based on said estimated side-slip acceleration.

6. The side-slip velocity estimation module of claim 1 wherein said limited-frequency integrator includes a high-pass filter.

7. The side-slip velocity estimation module of claim 1 wherein said limited-frequency integrator includes a feedback loop.

8. The side-slip velocity estimation module of claim 1 wherein said estimated side-slip velocity is compared to a desired side-slip velocity to produce a side-slip control signal.

9. The side-slip velocity estimation module of claim 8 wherein said side-slip control signal is combined with a yaw rate control signal to produce an actuator control signal.

10. The side-slip velocity estimation module of claim 9 wherein said actuator control signal is received by at least one brake actuator that applies a brake pressure difference across at least one axle of said vehicle to create a yaw moment to correct a dynamic behavior of said vehicle.

11. A side-slip velocity estimation module for a vehicle stability enhancement control system, comprising:
  a side-slip acceleration estimation module that determines an estimated side-slip acceleration of a vehicle; and
  a limited-frequency integrator that integrates said estimated side-slip acceleration to determine an estimated side-slip velocity of said vehicle,
  wherein said estimated side-slip velocity is compared to a desired side-slip velocity to produce a side-slip control signal, said side-slip control signal is combined with a yaw rate control signal to produce an actuator control signal, and said actuator control signal is received by a rear-wheel steering actuator that turns a set of rear wheels of said vehicle to create a yaw moment to correct a dynamic behavior of said vehicle.

12. A method of side-slip velocity estimation for a vehicle stability enhancement control system, comprising:
  determining an estimated side-slip acceleration of a vehicle;
  integrating said estimated side-slip acceleration to determine an estimated side-slip velocity of said vehicle, wherein said estimated side-slip acceleration is integrated with a limited-frequency integrator; and
  clearing an output of said limited-frequency integrator when a first condition occurs.

13. The method of claim 12 wherein said estimated side-slip acceleration is determined based on a yaw rate, a lateral acceleration, and a speed of said vehicle.

14. The method of claim 12 wherein said first condition is a straight-driving condition that is determined based on a yaw rate, a lateral acceleration, and an angle of a steering wheel of said vehicle.

15. The method of claim 12 wherein said first condition is a speed condition that is based on a speed of said vehicle.

16. The method of claim 12 wherein said first condition is a sensor bias condition that is based on said estimated side-slip acceleration.

17. The method of claim 12 wherein said limited-frequency integrator includes a high-pass filter.

18. The method of claim 12 wherein said limited-frequency integrator includes a feedback loop.

19. The method of claim 12 further comprising:
  comparing said estimated side-slip velocity to a desired side-slip velocity to produce a side-slip control signal.

20. The method of claim 19, further comprising:
  combining said side-slip control signal with a yaw-rate control signal to produce an actuator control signal.

21. The method of claim 20, further comprising:
  transmitting said actuator control signal to at least one brake actuator; and
  applying a brake pressure difference across at least one axle of said vehicle to create a yaw moment to correct a dynamic behavior of said vehicle.

22. A method of side-slip velocity estimation for a vehicle stability enhancement control system, comprising:
  determining an estimated side-slip acceleration of a vehicle;
  integrating said estimated side-slip acceleration to determine an estimated side-slip velocity of said vehicle, wherein said estimated side-slip acceleration is integrated with a limited-frequency integrator;
  comparing said estimated side-slip velocity to a desired side-slip velocity to produce a side-slip control signal;
  combining said side-slip control signal with a yaw-rate control signal to produce an actuator control signal;
  transmitting said actuator control signal to a rear-wheel steering actuator; and
  turning a set of rear wheels of said vehicle to create a yaw moment to correct a dynamic behavior of said vehicle.

23. A method of side-slip velocity estimation for a vehicle stability enhancement control system, comprising:
  determining an estimated side-slip acceleration of a vehicle based on a yaw rate, a lateral acceleration, and a speed of said vehicle;
  integrating said estimated side-slip acceleration to determine an estimated side-slip velocity of said vehicle, wherein said estimated side-slip acceleration is integrated with a limited-frequency integrator; and
  clearing an output of said limited-frequency integrator when a first condition occurs, wherein said first condition is at least one of a straight-driving condition, a speed condition, and a sensor bias condition.

* * * * *